(12) United States Patent
Breuer et al.

(10) Patent No.: US 7,373,775 B2
(45) Date of Patent: May 20, 2008

(54) METHOD FOR METERING AMMONIA INTO THE EXHAUST-GAS REGION OF AN INTERNAL COMBUSTION ENGINE AND DEVICE FOR IMPLEMENTING THE METHOD

(75) Inventors: Norbert Breuer, Ditzingen (DE); Katharina Körting, Schorndorf (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/023,210

(22) Filed: Dec. 21, 2004

(65) Prior Publication Data

US 2005/0198943 A1  Sep. 15, 2005

(30) Foreign Application Priority Data

Jan. 8, 2004  (DE)  ............... 10 2004 001 331

(51) Int. Cl.
*F01N 3/00* (2006.01)
*F01N 3/10* (2006.01)
(52) U.S. Cl. ............................ 60/286; 60/285; 60/287; 60/299; 60/301
(58) Field of Classification Search .................. 60/285, 60/286, 287, 299, 301
See application file for complete search history.

(56) References Cited

U.S. PATENT DOCUMENTS

| 5,785,937 | A | | 7/1998 | Neufert et al. |
| 5,884,475 | A | * | 3/1999 | Hofmann et al. .............. 60/274 |
| 5,943,858 | A | * | 8/1999 | Hofmann et al. .............. 60/303 |
| 5,974,794 | A | * | 11/1999 | Gotoh et al. ................... 60/286 |
| 6,546,720 | B2 | * | 4/2003 | van Nieuwstadt ............ 60/286 |
| 6,662,553 | B2 | * | 12/2003 | Patchett et al. ................ 60/286 |
| 6,935,103 | B2 | * | 8/2005 | Binder et al. .................. 60/286 |
| 2005/0069476 | A1 | * | 3/2005 | Blakeman et al. ........ 423/239.1 |

FOREIGN PATENT DOCUMENTS

| DE | 101 39 142 | 2/2003 |
| DE | 103 16 184 | 10/2004 |

* cited by examiner

*Primary Examiner*—Thomas Denion
*Assistant Examiner*—Loren Edwards
(74) *Attorney, Agent, or Firm*—Kenyon & Kenyon LLP

(57) ABSTRACT

A method for metering ammonia into the exhaust-gas region of an internal combustion engine and a device for implementing the method. The ammonia storage capacity of an SCR catalytic converter situated in the exhaust-gas region of the internal combustion engine is utilized. After the internal combustion engine has been switched off, ammonia is introduced into the exhaust-gas region in front of the SCR catalytic converter. Thus, following a renewed start-up of the internal combustion engine, the ammonia required in the SCR catalytic converter for reducing the nitrogen oxides contained in the exhaust gas of the internal combustion engine are already available before an ammonia source is ready for operation. The procedure eliminates the need for a pressure storage of ammonia in the switched-off state of the internal combustion engine.

12 Claims, 1 Drawing Sheet

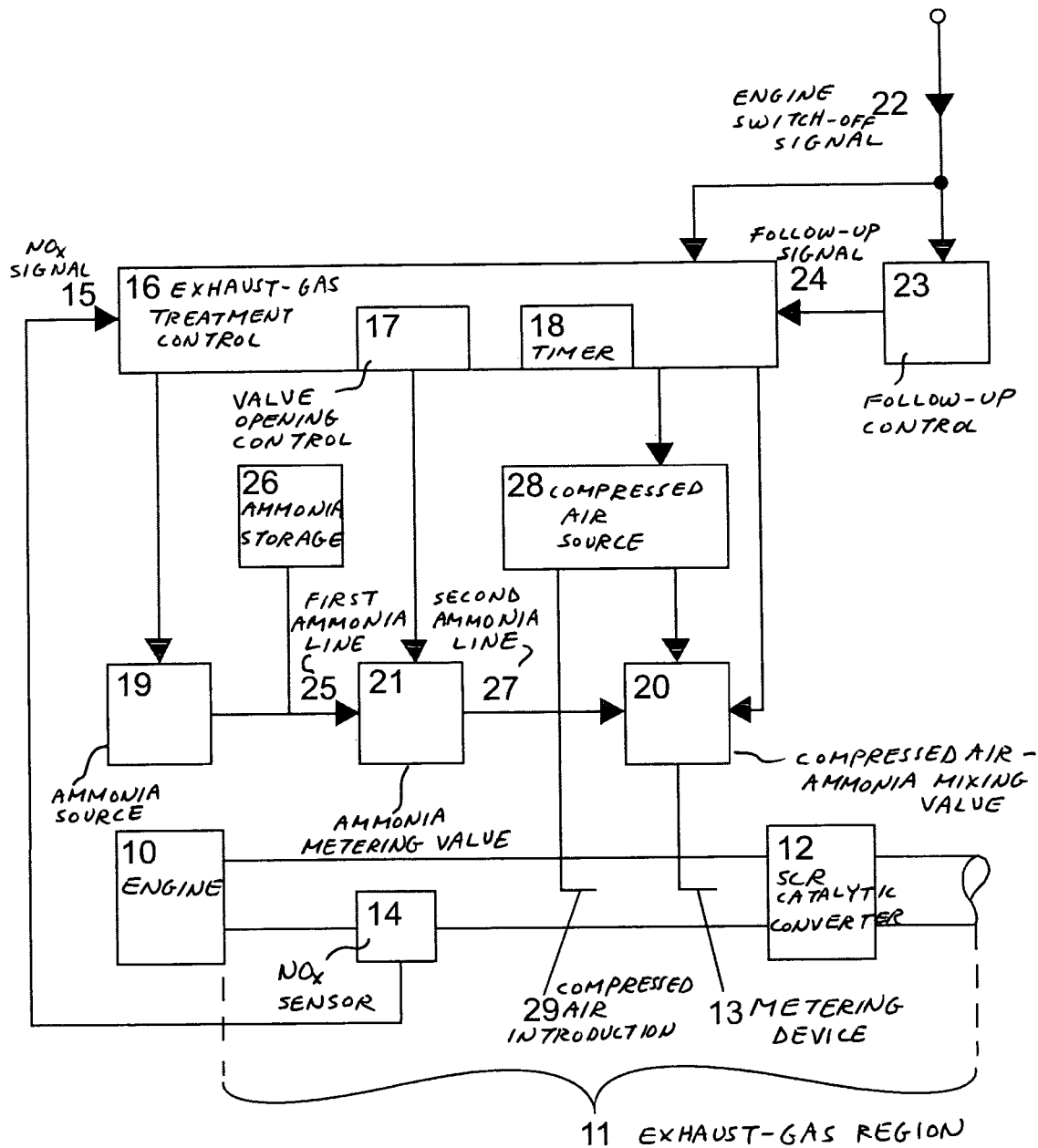
FIGURE

METHOD FOR METERING AMMONIA INTO THE EXHAUST-GAS REGION OF AN INTERNAL COMBUSTION ENGINE AND DEVICE FOR IMPLEMENTING THE METHOD

BACKGROUND INFORMATION

German Patent Application No. DE 101 39 142 describes an exhaust-gas treatment system of an internal combustion engine, in which an SCR catalytic converter (selective catalytic reduction) is used for reducing the NOx emission, which reduces the nitrogen oxides NO and NO2 to Nitrogen N2 using the reducing agent ammonia. The ammonia is obtained in a hydrolysis catalytic converter from a urea-water solution. The hydrolysis catalytic converter, situated in front of the SCR catalytic converter in the direction of flow, converts the urea contained in the urea-water solution to ammonia and carbon dioxide with the aid of water. To ensure exact metering, there is a provision to ascertain the concentration of the urea-water solution.

German Patent Application No. DE 103 16 184 (not prepublished) describes a method for metering the urea-water solution into the exhaust-gas stream of an internal combustion engine, in which the urea-water solution is carried in at least one component and a measure for the temperature of the component is detected. The measure for the temperature is compared to a temperature threshold value corresponding to the freezing temperature of the urea-water solution. A freezing cycle counter records the number of freezing processes of the urea-water solution, which subject the components to mechanical stress. When a specified counter reading is exceeded, a diagnostic instruction may be given for checking the components. An existing follow-up control, which is active after the internal combustion engine has been switched off, makes it possible to check whether the component is still filled with the urea-water solution even after the internal combustion engine has been switched off.

Prior to being injected into the exhaust-gas region of the internal combustion engine, the ammonia can be obtained in an external ammonia source from ammonium carbamate for example. The preparation of the ammonia either in an external ammonia source or in a hydrolysis catalytic converter requires that a certain temperature range obtains. The operating temperature of a hydrolysis catalytic converter for example lies in a range of 180° C.-250° C. Hence, when the internal combustion engine is put into operation beginning with a cold start, the ammonia required for the reduction reaction in the SCR catalytic converter is generally not yet available. In this operating state there is consequently an increased NOx emission behind the as yet ineffective SCR catalytic converter.

The present invention is based on the objective of providing a method for metering ammonia into the exhaust-gas region of an internal combustion engine as well as a device for implementing the method, which allow for the adherence to an NOx emission that is as low as possible.

SUMMARY OF THE INVENTION

The procedure according to the present invention uses the ammonia storage capacity of an SCR catalytic converter. After the internal combustion engine has been switched off, ammonia is introduced into the exhaust-gas region of the internal combustion engine containing the SCR catalytic converter. At this time, the ammonia is no longer required in the SCR catalytic converter, due to the discontinuation of the exhaust gas of the internal combustion engine, and is therefore stored. Since the ammonia storage capacity of the SCR catalytic converter is greater at lower temperatures than at higher temperatures, the SCR catalytic converter is able to store more ammonia while cooling down after the internal combustion engine has been switched off than would be possible during the operation of the internal combustion engine.

The procedure according to the present invention provides the SCR catalytic converter with the ammonia required for the conversion of the NOx immediately after the internal combustion engine is put into operation. This reduction reaction can begin immediately as soon as the operating temperature of the SCR catalytic converter is reached. An ammonia source situated outside of the exhaust-gas region of the internal combustion engine does not yet have to be operational at this time.

The procedure according to the present invention in particular has the advantage that the ammonia source can be emptied following the shutdown of the internal combustion engine so that in the switched off state of the internal combustion engine the entire system contains no or only small quantities of ammonia. If the internal combustion engine is situated in a motor vehicle, an undesired pressure storage of ammonia in the parked vehicle is eliminated.

A refinement provides for an ammonia metering valve to be triggered to open after the internal combustion engine has been switched off. The already existing ammonia metering valve is thus utilized for introducing the ammonia even after the internal combustion engine is switched off.

A refinement allows for an internal combustion engine shutdown signal to be provided as the internal combustion engine is switched off, which prompts the additional steps of the method according to the present invention.

A refinement provides for the triggering of a compressed air-ammonia mixing valve for admixing compressed air to the ammonia. The compressed air ensures that the ammonia flows through the SCR catalytic converter after the exhaust-gas stream is discontinued.

A refinement provides for a triggering of the ammonia metering valve and/or of the compressed air-ammonia mixing valve for a specified time after the internal combustion engine has been switched off. The time limit for the opening of the ammonia metering valve ensures that following the expiration of the specified time period the system possibly containing residues of ammonia is sealed.

A further development provides for the ammonia metering valve to be increasingly opened with the passing of time. These measures make it possible to utilize specifically the increasing ammonia storage capacity as the temperature of the SCR catalytic converter decreases.

A further development provides for the ammonia metering valve to be triggered as a function of at least one NOx signal. The further development allows for the quantity of the ammonia introduced into the exhaust-gas region to be adjusted as a function of the NOx contained in the exhaust-gas stream. The NOx signal may be calculated from known characteristic quantities of the internal combustion engine and/or may be provided by an NOx sensor situated in the exhaust-gas region.

A further development provides for compressed air to be introduced directly into the exhaust-gas region via a compressed air introduction upstream of the SCR catalytic converter after the internal combustion engine has been switched off. This measure ensures that the ammonia present in front of the SCR catalytic converter enters the SCR catalytic converter after the internal combustion engine has been switched off.

The device according to the present invention for implementing the method includes all components required for implementing the method.

A refinement of the device provides for a thermolysis or hydrolysis reactor for preparing the ammonia.

An alternative refinement of the device provides for a storage material from which ammonia is desorbed.

Another alternative refinement of the device provides for an ammonia synthesis device for preparing the ammonia.

A refinement of the device according to the present invention provides for an ammonia storage which contributes toward improving the dynamics of the system.

BRIEF DESCRIPTION OF THE DRAWING

The FIGURE shows a device in which a method according to the present invention for metering ammonia into the exhaust-gas region of an internal combustion engine is implemented.

DETAILED DESCRIPTION

The FIGURE shows an internal combustion engine 10 that has an SCR catalytic converter 12, a metering device 13 and an NOx sensor 14 situated in its exhaust-gas region 11. NOx sensor 14 sends an NOx signal 15 to an exhaust-gas treatment control 16, which includes a valve opening control 17 as well as a timer 18.

Exhaust-gas treatment control 16 controls an ammonia source 19 as well as a compressed air-ammonia mixing valve 20. Valve opening control 17 contained in exhaust-gas treatment control 16 triggers an ammonia metering valve 21.

An internal combustion engine switch-off signal 22 is sent to exhaust-gas treatment control 16 as well as to a follow-up control 23. Follow-up control 23 sends a follow-up signal 24 to exhaust-gas treatment control 16.

Ammonia source 19 is connected to ammonia metering valve 21 via a first ammonia line 25. An ammonia storage 26 is connected to first ammonia line 25. Via a second ammonia line 27, ammonia metering valve 21 is connected to compressed air-ammonia mixing valve 20, to which additionally a compressed air source 28 is connected, which is triggered by exhaust-gas treatment control 16. Compressed air source 28 is connected to a compressed air introduction 29 situated in exhaust-gas region 11 upstream of metering device 13. Compressed air-ammonia mixing valve 20 is connected to metering device 13 situated in exhaust-gas region 11.

The method according to the present invention functions as follows:

SCR catalytic converter 12 situated in exhaust-gas region 11 of internal combustion engine 10 reduces the nitrogen oxides NO and NO2 contained in the exhaust gas of internal combustion engine 10 to nitrogen N2 SCR catalytic converter 12 requires ammonia NH3 for the reduction. The ammonia is prepared in ammonia source 19, which performs a thermal decomposition of ammonium carbamate for example. In the thermolysis of ammonium carbamate in a thermolysis reactor, CO2 is produced in addition to NH3. Only NH3 will be used in the following to designate the product gas stream of ammonia source 19. Another implementation option of ammonia source 19 provides for the ammonia to be desorbed from a storage material (e.g. a metal chloride) while the storage material is being heated. In addition it is possible that ammonia source 19 takes the form of an ammonia synthesis device.

Ammonia metering valve 21, which is triggered by valve opening control 17, is provided for metering the ammonia. In the simplest case, metering can occur by open-loop control. Preferably an automatic control or at least a consideration of the NOx emission of internal combustion engine 10 in the current operating state is provided. The NOx emission, for example, may be calculated as a function of known characteristic quantities of internal combustion engine 10. Suitable characteristic quantities are for example the rotational speed and/or an air mass signal and/or a fuel metering signal. These signals are provided by sensors that are not shown in the Figure.

Instead of calculating the NOx emission of internal combustion engine 10, the measurement of the NOx emission may be provided by NOx sensor 14 situated in exhaust-gas region 11 of internal combustion engine 10. NOx sensor 14 sends NOx signal 15 to exhaust-gas treatment control 16, so that valve opening control 17 contained in exhaust-gas treatment control 16 can adjust the degree of opening of ammonia metering valve 21 to the NOx concentration in the exhaust gas. The degree of opening may be specified via the opening cross section for example. In valves that can be triggered in a clocked manner, the degree of opening is set via the pulse duration-pulse pause ratio.

If the pressure of the ammonia behind ammonia metering valve 21 is higher with respect to the pressure in exhaust-gas region 11, second ammonia line 27 could be run directly to metering device 13 in exhaust-gas region 11. Metering device 13 is a suitably formed opening, from which ammonia streams into exhaust-gas region 11, where it mixes sufficiently with the exhaust-gas. For ensuring suitable pressure ratios and particularly for implementing the method according to the present invention after internal combustion engine 10 is switched off, compressed air source 28 is optionally provided, which delivers the compressed air to compressed air-ammonia mixing valve 20 and/or via compressed air introduction 29 directly into exhaust-gas region 11.

The provision of sufficient ammonia can be ensured in many operating situations of internal combustion engine 10 according to a special refinement by the use of optionally existing ammonia storage 26. In principle, ammonia storage 26 can ensure the provision of ammonia even when internal combustion engine 10 is switched off for an extended period.

The emission of ammonia to the surrounding air is undesired since the unpleasantly pungent smelling ammonia gas is toxic and is discerned in the air already at very low concentrations. Storing ammonia under pressure is therefore particularly undesirable if internal combustion engine 10 is situated in a motor vehicle in which long phases are to be expected during which the internal combustion engine is switched off. For this reason, it is desirable that at the end of the operating phase of internal combustion engine 10 all pressurized parts carrying ammonia are emptied into the SCR catalytic converter that acts as an ammonia absorber.

Until ammonia source 19 is ready for operation it can take a few minutes during which no ammonia is available if ammonia storage 26 is empty or if it does not exist at all. This operating state generally occurs when internal combustion engine 10 is started up following a phase during which it was switched off.

The present invention utilizes the ammonia storage capacity of the SCR catalytic converter 12. It can be proved theoretically as well as experimentally that an SCR catalytic converter 12 has an ammonia storage capacity that is a function of temperature. The storage capacity rises with decreasing temperature. For this reason, the method according to the present invention provides for the introduction of ammonia into exhaust-gas region 11 containing SCR catalytic converter 12 even after internal combustion engine 10 is switched off.

A simple implementation is possible by triggering ammonia metering valve 21 to open.

Switching off internal combustion engine 10 emits internal combustion engine switch-off signal 22, which is sent to follow-up control 23, which sends follow-up control signal 24 to exhaust-gas treatment control 16. Follow-up signal 24 ensures that the power supply of exhaust-gas treatment control 16 is guaranteed even after internal combustion engine 10 has been switched off.

It is particularly advantageous that the ammonia storage capacity rises with a falling temperature of SCR catalytic converter 12. SCR catalytic converter 12 begins to cool off when internal combustion engine 10 is switched off and the associated heating effect of the exhaust gases is eliminated.

In one refinement, ammonia metering valve 21 can be opened within the framework of a clocked operation or continuously. Ammonia metering valve 17 is preferably opened increasingly with the passing of time. This measure allows for the increase of the ammonia storage capacity of SCR catalytic converter 12 to be specifically utilized without an ammonia breakthrough occurring behind SCR catalytic converter 12. In one refinement, valve opening control 17 is able to trigger ammonia metering valve 21 to open for a period specified by timer 18. Once the specified period has passed, ammonia metering valve 21 is closed. This measure ensures that the system carrying ammonia is closed once the introduction of ammonia into exhaust-gas region 11 of switched-off internal combustion engine 10 has concluded.

After internal combustion engine 10 has been switched off, the exhaust-gas in exhaust-gas region 11, which transports the ammonia given off by metering device 13 to SCR catalytic converter 12, ceases to stream. The compressed air can be mixed into the ammonia by compressed air-ammonia mixing valve 20. This ensures that the ammonia is blown out of ammonia metering valve 21 and metering device 13. Additionally or alternatively there may be a provision for introducing the compressed air via a separate compressed air line and via a compressed air introduction 29 into exhaust-gas region 11 upstream of metering device 13. This ensures that the ammonia present in front of SCR catalytic converter 12 is able to enter SCR catalytic converter 12.

What is claimed is:

1. A method for introducing ammonia into an exhaust-gas region of an internal combustion engine, which includes an SCR catalytic converter, the method comprising:
    after the internal combustion engine has been switched off, introducing ammonia into the exhaust-gas region of the internal combustion engine, wherein, for introducing the ammonia, an ammonia metering valve is triggered to open increasingly with a passing of time to adjust the opening of the ammonia metering valve to ammonia storage capacity of the SCR catalytic converter, wherein the ammonia storage capacity of the SCR catalytic converter increases with falling temperature of the SCR catalytic converter.

2. The method according to claim 1, wherein the ammonia metering valve is triggered to open following an appearance of an internal combustion engine switch-off signal.

3. The method according to claim 1, further comprising triggering a compressed air-ammonia mixing valve for admixing compressed air to the ammonia.

4. The method according to claim 1, wherein the ammonia metering valve is triggered for a specified time period.

5. The method according to claim 1, wherein the ammonia metering valve is triggered as a function of at least one NOx signal.

6. The method according to claim 5, further comprising one of (a) calculating the NOx signal as a function of at least one characteristic quantity of the internal combustion engine and (b) providing the NOx signal by an NOx sensor situated in the exhaust-gas region of the internal combustion engine.

7. The method according to claim 1, further comprising, after the internal combustion engine has been switched off, introducing compressed air directly into the exhaust-gas region via a compressed air introduction upstream of the SCR catalytic converter.

8. A device for introducing ammonia into an exhaust-gas region of an internal combustion engine, which includes an SCR catalytic converter, the device comprising:
    an arrangement for introducing ammonia into the exhaust-gas region of the engine, after the engine has been switched off, wherein, for introducing the ammonia, the arrangement includes an ammonia metering valve which is triggered to open increasingly with a passing of time to adjust the opening of the ammonia metering valve to ammonia storage capacity of the SCR catalytic converter, wherein the ammonia storage capacity of the SCR catalytic converter increases with falling temperature of the SCR catalytic converter.

9. The device according to claim 8, further comprising one of a thermolysis and hydrolysis reactor for preparing the ammonia.

10. The device according to claim 8, further comprising a storage material from which ammonia is desorbed.

11. The device according to claim 8, further comprising an ammonia synthesis device for preparing the ammonia.

12. The device according to claim 8, further comprising an ammonia storage.

* * * * *